United States Patent
Sasaki et al.

[11] Patent Number: 5,308,424
[45] Date of Patent: May 3, 1994

[54] MULTIAXIAL NONWOVEN FABRIC, AND METHOD OF MAKING THE SAME

[75] Inventors: Yasuo Sasaki, Houya; Haruhisa Tani, Tokorozawa; Yuuki Kuroiwa, Niiza; Setsuya Tsuyama, Nerima, all of Japan

[73] Assignee: Polymer Processing Research Institute Ltd., Japan

[21] Appl. No.: 359,569

[22] Filed: Jun. 1, 1989

[30] Foreign Application Priority Data

Jun. 6, 1988 [JP] Japan .................. 63-138888

[51] Int. Cl.$^5$ .................................. B32B 5/00
[52] U.S. Cl. ......................... 156/178; 156/177; 156/179; 156/180; 156/181; 428/105; 428/109
[58] Field of Search ............ 428/105, 109, 114, 110; 156/180, 181, 177, 178, 179; 66/84 A, 84 R

[56] References Cited

U.S. PATENT DOCUMENTS

| | | | |
|---|---|---|---|
| 4,043,855 | 8/1977 | Patin | 156/178 |
| 4,080,232 | 3/1978 | Friedrich | 156/178 |
| 4,233,350 | 11/1980 | Shiflet | 428/110 |
| 4,556,440 | 12/1985 | Krueger | 156/177 |
| 4,877,470 | 10/1989 | Krueger | 156/177 |
| 5,047,109 | 9/1991 | Krueger | 156/177 |

*Primary Examiner*—James J. Bell
*Attorney, Agent, or Firm*—Bruce I. Adams; Van C. Wilks

[57] ABSTRACT

A multiaxial nonwoven fabric is disclosed which is comprised of a selected warp material and a multiplicity of selected continuous yarns assembled in a specified lay pattern and bonded on to the warp material. Each of the yarns is oriented in a scalene or right-angled triangle shape, and the resulting yarn assembly is built of intersections at least in warp, weft and oblique axes, whereby structural strength and dimensional stability are greatly improved. A method and an apparatus are also disclosed for producing the fabric.

15 Claims, 3 Drawing Sheets

MULTIAXIAL NONWOVEN FABRIC, AND METHOD OF MAKING THE SAME

BACKGROUND OF THE INVENTION

1. Technical Field

This invention is concerned with nonwoven fabrics and more particularly with a multiaxial nonwoven fabric in which a multiplicity of selected continuous yarns are assembled in a specified lay pattern by mechanical interlocking. The invention further relates to a method of and an apparatus for producing such multiaxial fabric.

By the term multiaxial nonwoven fabric used herein is meant a fabric designed to have its constituent yarns intersected in two or more different axes and even in a weftwise axis.

2. Prior Art

Certain nonwoven fabrics have been developed and marketed, one of which is formed of a number of parallel continuous yarns obliquely crossed and adhesively bonded to a substrate such as paper, film, aluminum foil or cloth. Another fabric is of a triaxial structure having bound an additional group of arranged warps. Both fabrics are formed typically by a method in which the basic or constituent yarns are allowed to reciprocally run at right angle to the path of travel of a conveyor belt and when brought into hooking engagement, upon arrival at their turning points, with two arrays of pins each located on and along one longitudinal edge of the belt, they are crossed obliquely with one another.

In such prior fabrics, however, the basic yarns each are oriented in the shape of an isosceles triangle when one vertex is taken against the base between the two other vertices. These fabrics, though physically adequate in both a warp and an oblique direction, are mechanically weak and dimensionally unstable in a weft direction.

To cope with the above problems, the conveyor belt is required to travel at low speed so as to reciprocate the basic yarns while being held obliquely at an identical angle and nearly at a weftwise level, rendering the final fabric laterally dense. Such mode of formation is undesirable for practical purposes as it is rather tedious and complicated, less productive and yet susceptible to quality irregularities and cost burdens.

SUMMARY OF THE INVENTION

With the foregoing difficulties of the prior art in view, the present invention seeks to provide an improved nonwoven fabric of a multiaxial type which has a multiplicity of continuous yarns laid to intersect in warp and countersymmetrically oblique axes and even in a weft or nearly weft axis, thus exhibiting not only a good balance of structural strength and dimensional stability characteristics but also aesthetical appearance. The invention also provides a method of and an apparatus for the production of such nonwoven fabric in a one-step operation and at high speed and with high efficiency and great economy.

The fabric of the invention finds application particularly as a base material for FRP plastics and as a material of reinforcement in various sectors of industry.

According to a first aspect of the invention, there is provided a multiaxial nonwoven fabric comprising (a) a warp material, and (b) a multiplicity of continuous yarns laid in tensioned, intersected relation by successive bending at a predetermined angle and on two opposite sides of the fabric corresponding to two widthwise ends of the warp material, thereby forming a yarn assembly in which each of the yarns is oriented to define a scalene or right-angled triangle as determined by taking one vertex against the straight line between the two other vertices, and subsequently by adhesive bonding onto the warp material.

According to a second aspect of the invention, there is provided a method of producing a multiaxial nonwoven fabric which comprises (a) driving a conveyor belt to travel, the belt being provided on and along respective longitudinal edges thereof with two arrays of pins of a predetermined pitch, (b) reciprocating a multiplicity of parallel continuous yarns at a predetermined angle between the arrays of pins, the yarns being fed at the same pitch as the pins, (c) advancing the pins in the same number as the yarns with one reciprocation of the yarns in such a manner that the yarns are brought into hooking engagement, upon arrival at their turning points, with the pins in either array and bent in zigzag form with varying lengths of the yarns at the going and coming routes, thereby forming a yarn assembly having the yarns intersected in weft and oblique axes, and (d) overlying and bonding a warp material onto the yarn assembly prior to or after release from the arrays of pins.

According to a third aspect of the invention, there is provided an apparatus for producing a multiaxial nonwoven fabric which comprises (a) a conveyor belt provided on and along respective longitudinal edges thereof with two arrays of pins of a predetermined pitch, (b) two traverser supports positioned at forward and rearward sides of the travel path of the belt and disposed over and across the belt, each of the supports including a pair of parallel rods and a traverser mounted for sliding movement on and along the rods, the supports being oppositely inclined at a predetermined angle with respect to the travel path of the belt, (c) two rows of yarn guides disposed in the traversers at the same pitch and direction as the arrays of pins, (d) means controlling the speed of the belt at which to advance the pins in the same number as the yarn guides, (e) means feeding a warp material on to the belt, and (f) means bonding the warp material to the resulting yarn assembly.

DETAILED DESCRIPTION OF THE INVENTION

Figure 1:
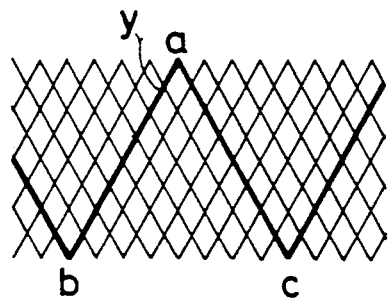
FIG. 1 is a schematic representation, partly enlarged, of one lay pattern of the prior art.

With reference to FIG. 1, there is shown a certain multiaxial nonwoven fabric of the prior art in which a multiplicity of continuous yarns are laid in zigzag form, the yarns being bent at identical angles on two opposite sides of the fabric. A single continuous yarn, indicated in a bold line and designated at y, is run to assume an isosceles triangle when a vertex a is taken against the base defined by two other vertices b and c. With this lay pattern, inadequate weftwise strength is necessarily developed as noted hereinbefore.

A multiaxial nonwoven fabric according to the invention is comprised of a selected warp material and a multiplicity of selected continuous yarns assembled in a unique fashion and attached onto the warp material.

Figure 2A:
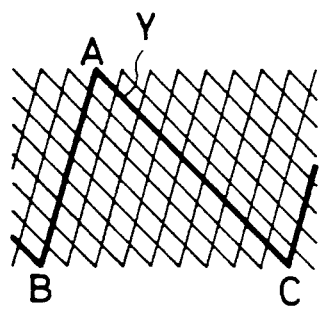
FIGS. 2A and 3A are views similar to FIG. 1, but showing preferred lay patterns embodying the present invention.
Figure 3A:
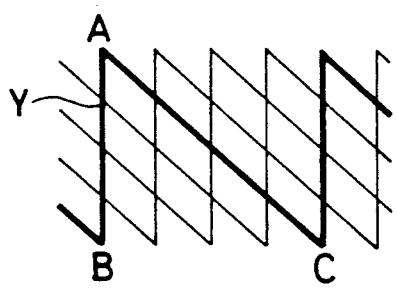

In certain preferred lay patterns contemplated under the invention, the yarns are laid in tensioned, intersected relation by bending at identical angles and on two opposite sides of the fabric, the fabric sides being taken to correspond to two widthwise ends of the warp material (not shown), as seen from FIGS. 2A and 3A. Importantly, a constituent yarn Y can be oriented, despite bending at one and the same angle on both sides, in the shape of a scalene triangle ABC (FIG. 2A) or a right-angled triangle ABC (FIG. 3A). The two types of angles are determined by taking one vertex A against the base between two other vertices B and C. Such yarn orientation is sharply contrasted to the prior lay pattern. The resulting yarn assembly is thereafter bonded onto the warp material, whereby the desired nonwoven fabric is provided.

Figure 2B:
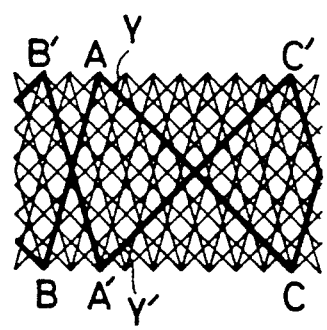
FIGS. 2B, 3B and 3C are views of modified forms of the patterns shown in FIGS. 2A and 3A.
Figure 3B:
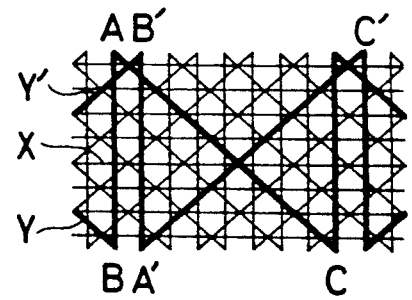

Modified forms of the lay patterns of FIGS. 2A and 3A are illustrated in FIGS. 2B and 3B in which a different group of yarns Y' is overlaid in the form of an inverted scalene triangle A'B'C' (FIG. 2B) or an inverted right-angled triangle A'B'C' (FIG. 3B) on the first mentioned patterns (FIGS. 2A and 3A). Particularly preferred is a nonwoven fabric shown in FIG. 3B, which fabric is formed with a group of arranged warps X further overlaid by bonding to the ABC-A'B'C' structure. Such fabric has three different groups of yarns Y, Y' and X intersected in warp, weft and countersymmetrically oblique axes, leading to sufficient strength in the tetraaxial direction.

Figure 3C:
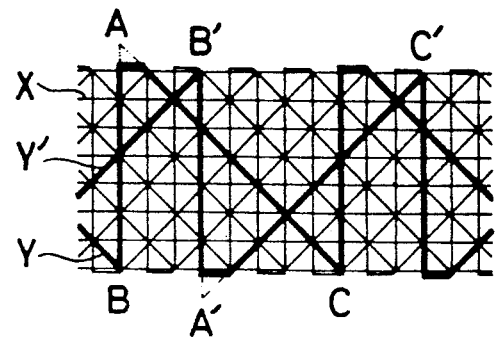

FIG. 3C shows still another preferred form of the fabric of FIG. 3B. This form results from slight modification of the vertices A and A' on the two right-angled triangles ABC and A'B'C' with the results that all the constituent yarns may intersect substantially in a straight line and hence improve aesthetical appearance.

Specific examples of yarns include organic, inorganic and metallic fibers, stranded rovings, tape yarns, split yarns and the like. Warp materials used herein may be selected for instance from papers, films, aluminum foils, foamed sheets, different nonwoven fabrics, arranged warps and the like. Preferred among these warp materials are arranged warps to be overlaid on either or both of the upper and lower surfaces of the yarn assembly and then bonded to the intersected portions.

The invention is also contemplated for the provision of a method of and an apparatus for producing the above specified fabric.

Figure 4:
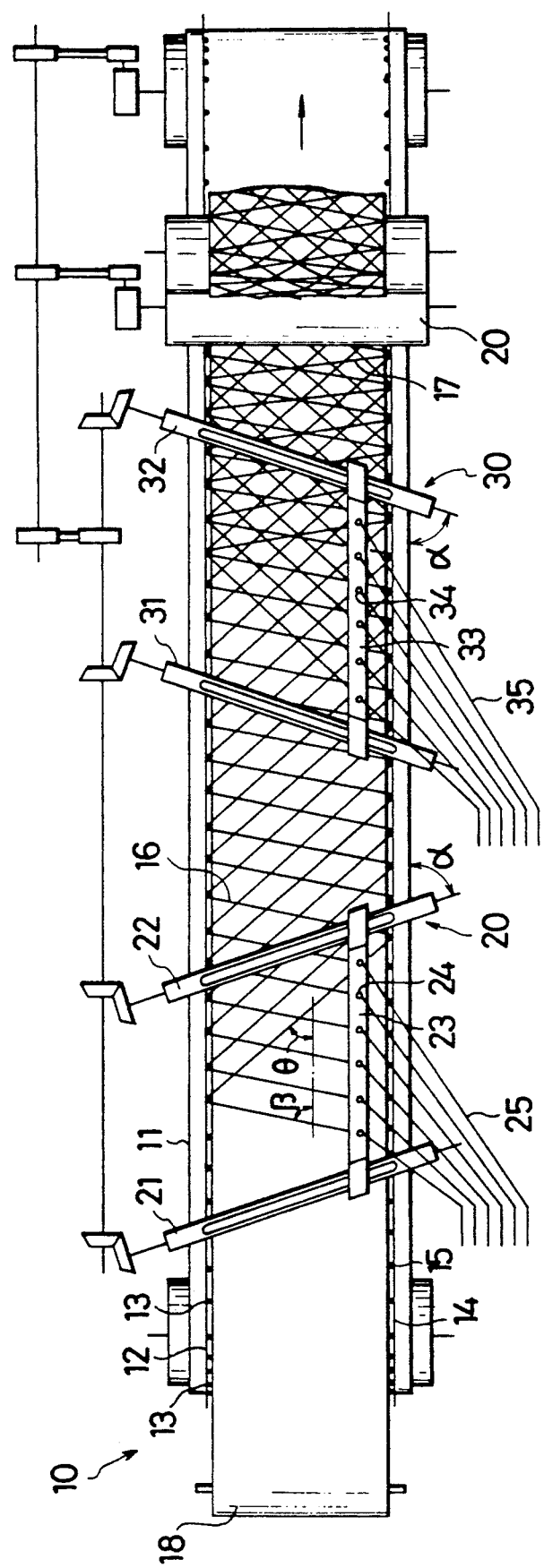
FIGS. 4 and 5 are views, seen in plan and from elevation, of the apparatus constructed in accordance with the invention.
Figure 5:
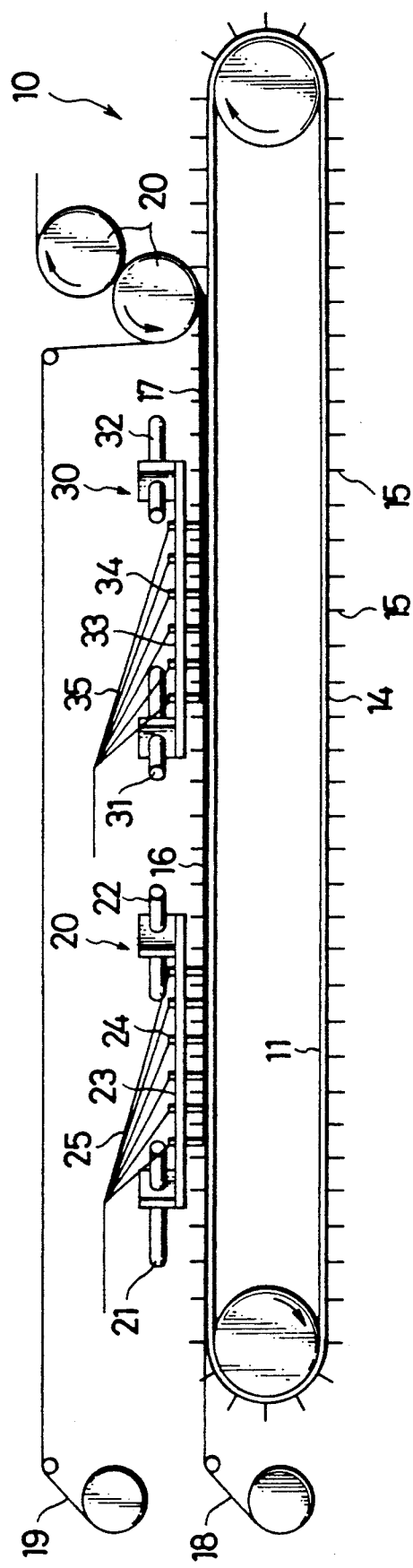

An apparatus, provided in accordance with the invention and shown at 10 in FIGS. 4 and 5, is constructed essentially with a conveyor belt 11 and two sets of traverser supports 20 and 30. The belt 11 is provided on and along two longitudinal edges with an array 12 of pins 13 and a companion array 14 of pins 15 both for yarn hooking, the pins 13 and 15 being spaced apart at a given pitch. The support 20 is made up of a pair of parallel rods 21 and 22 and an elongate traverser 23 secured at both ends to the rods 21 and 22 for sliding movement in known manner. The support 30, composed of two rods 31 and 32 and a traverser 33, is devised substantially identical to the support 20 as better seen from FIG. 4.

The supports 20 and 30 are positioned at rearward and forward sides with respect to the travel path of the belt 11 as indicated by the arrow in FIG. 4 and disposed to straddle the belt 11. Both supports should importantly be inclined oppositely at a predetermined angle $\alpha$ to the belt path.

Mounted on the traversers 23 and 33 are rows of yarn guides 24 and 34, respectively, for guiding two groups of selected continuous yarns 25 and 35 onto the belt 11 from yarn feeding means (not shown). The guides 24 and 34 are placed in aligned relation with the pin arrays 12 and 14 and may be formed for example of pipes of reduced diameter and increased number.

Designated at 16 and 17 are first and second yarn assemblies resulting from the reciprocal action of the traversers 23 and 33 as described later. A pair of rolls 20 are located adjacent to a front end of the belt path for subsequent bonding of the yarn assemblies with a warp material 18 (FIG. 4) and if necessary with a similar material 19 (FIG. 5).

In operation, the belt 11 is driven to travel on suitable driving means, whereas the traversers 23 and 33 are actuated to feed the yarns 25 onto the belt 11 from the guide 24 to thereby form the first yarn assembly 16 and the second yarn assembly 17 by further feeding the yarns 35 from the guide 34 on to the first assembly 16. The yarns 25 and 35 are run to bring into hooking engagement, on arrival at their turning points, with the pin arrays 12 and 14 and thus bent obliquely with one another.

To achieve the desired lay of the first group of yarns 25, the following conditions will now be assumed with equations (1) and (2).

$$\tan \beta = \frac{L}{S/2 - L \cot \alpha} \quad (1)$$

$$\tan \theta = \frac{L}{S/2 + L \cot \alpha} \quad (2)$$

where
- L : distance between pin arrays 12 and 14
- S : distance at which belt 11 advances with one reciprocation of traverser 23
- $\beta$ : angle at which yarns 25 reciprocate warpwise
- $\theta$ : angle at which yarns 25 run obliquely By strict observance of equations (1) and (2), the yarns are hooked at varying length and in zigzag form with the pins 13 and 15 at the going and coming routes of the traverser 23. The first yarn assembly 16 is thus provided in a scalene triangle shape as shown in FIG. 2A.

If the rods 21 and 22 of the traverser support 20 are placed in parallel to one side of a scalene triangle defined by L as the height and S as the base, equation (1) is rearranged as $$\cot \alpha = S/2L$$

$$\tan \beta = \infty$$

this meaning that the yarns 25 get displaced at a right angle, i.e. on a weftwise level, to the warp axis when the traverser 23 moves obliquely toward the travel path of the belt 11.

In the case of $S = L$ and hence $\cot \alpha = \frac{1}{2}$ and $\alpha = 63°25'$, equation (2) is arranged to give $$\tan \theta = 1$$

the yarns 25 being therefore run at an angle of 45° to the warp axis when the traverser 23 is moved to a counteroblique direction.

The second yarn assembly 17 may suitably be formed by overlying the assembly 16 with the second group of yarns 35 fed out of the yarn guide 34 of the traverser 33. The front traverser 33 is reciprocally moved at the same stroke speed as and with the same yarn number as the rear traverser 23. The yarns 35 are laid to assume an inverted scalene triangle, and the resulting assembly 17 is built with yarn intersections in the countersymmetrically oblique axes.

The yarn assembly 16 or 17 is thereafter bound on its lower surface with the warp material 18 being introduced onto the belt 11, followed by passage through the rolls 20 to ensure firm bonding and by subsequent release from the pin arrays 12 and 14, after which the desired nonwoven fabric is obtained. The assembly may if necessary be superposed even on an upper surface, while in bonding on the lower surface, with the warp material 19 supplied from other than the belt 11 and after being taken out in sandwiched form, then transported for fixation on another set of rolls (not shown). The fixation may be effected using hot-melt or emulsion type binders or their combinations. The warps 18 and 19 may conveniently be precoated with a suitable binder such as, for example, either one of the binders specified above.

According to additional preferred embodiments of the method of the invention, a multiplicity of continuous yarns are laid into a yarn assembly having intersections in oblique and weft axes by reciprocation between the arrays of pins and in parallel to an orbit determined by one side of an isosceles triangle, which triangle is defined by taking as the height the distance between the arrays of pins and as the base the distance at which the belt travels with one reciprocation of the yarns, and subsequently by displacement of the axial centers of the yarns at a right angle to the warp axis at either of the going and coming routes. Further, a multiplicity of continuous yarns in a plurality of sets may be laid into a yarn assembly having intersections in more than two axes by feeding to the belt at different respective positions and subsequently by reciprocation between the arrays of pins and in parallel to an orbit defined to cross the belt at an angle different from or symmetrical to the warp axis.

EXAMPLE OF THE INVENTION

The following example is given to further illustrate the present invention, but should not be construed as limiting the invention.

In the arrangement shown in FIGS. 4 and 5, a conveyor belt was used which was provided on its longitudinal edges with two arrays of pins of 1.5 mm in diameter, 15 mm in length, 7 mm in pitch and 560 mm in array-to-array width. Two traverser supports, each provided thereon with a slidable traverser, were positioned at forward and rearward sides of the travel path of the belt and disposed over and across the belt. The supports were oppositely inclined at 63°25' with respect to the belt path. A row of 40 pipes of small sizes, 2 mm in inside diameter and 30 mm in length and of 14 mm in pitch was mounted as a yarn guide on each of the traversers. The pipes each were arranged to piercingly project 15 mm beneath the traverser.

The driving gear ratio and pulley diameter were determined such that the belt was advanced at a distance of 560 mm upon turning of the pulley by a ½ revolution while the front and rear traversers were being moved with one reciprocation at a stroke of 640 mm and at a revolution of 20 on the supports. Each of the traversers was so mounted as to protrude, when in return motion, about 10 mm out of the pin array on either a right or a left side.

The belt was driven to travel at a speed of 18 m/min with two groups of glass rovings of 10,000 deniers, 40 ends in one group, fed on to the belt through the yarn guides. One group of rovings from the rear traverser was hooked with alternate pins in the arrays (at 14 mm pitch) and with two adjacent pins on the protruded side so that the rovings were laid in zigzag form in a weft and an oblique direction at 45°. Another group of rovings guided from the front traverser was brought into hooking engagement with intermediate pins located between the above alternated pins and thus laid in an inverted zigzag shape.

There was obtained a yarn assembly in which 80 rovings were intersected at a pitch of 7 mm in the weft axis and at 45° in the countersymmetrically oblique axes.

Subsequently, rovings of 10,000 deniers were interconnected as warps with the yarn assembly formed above, which rovings were precoated with a hot-melt binder. To be more specific, a first group of 41 ends arranged at a pitch of 14 mm was guided onto the belt, whereas a second group of 40 ends arranged in like manner was shifted at a pitch of 7 mm and fed onto heating rolls located adjacent to a front end of the belt path. As the belt was continued to travel, the yarn assembly was bound on a lower surface with the first roving group and then released successively from the pin arrays, followed by transport to the rolls for adhesion on an upper surface with the second roving group. The yarn assembly was taken out of the rolls which was sandwiched between the two groups of warps and bound at the intersected portions.

The method and apparatus of the invention have been found to produce a nonwoven fabric of a multiaxial structure having its constituent yarns intersected regularly in the warp, weft and countersymmetrically oblique axes, i.e. in the tetraaxial direction, as seen from FIG. 3C. The fabric is highly mechanically strong, dimensionally stable and ornamentally visible.

While the invention has been described in conjunction with certain specific embodiments thereof, it should be noted that various changes and modifications may be made as conceived by those skilled in the art within the scope of the appended claims.

What is claimed is:

1. A method of producing a multiaxial nonwoven fabric which comprises:
    (a) driving a conveyor belt along a path of travel, said belt being provided with two arrays of pins of a predetermined pitch extending on and along respective opposite longitudinal edges thereof;
    (b) reciprocating a multiplicity of parallel continuous yarns at a predetermined angle between said arrays of pins and at the same pitch as said pins;
    (c) advancing said pins in the same number as said yarns with one reciprocation of the yarns in such a manner that said yarns are brought into hooking engagement, upon arrival at their turning points, with said pins in either array and bent in zigzag form with varying lengths of the yarns at their going and coming routes, thereby forming a yarn assembly having said yarns intersected on weft and oblique axes by reciprocation between said arrays of pins and parallel to an orbit determined by one side of an isosceles triangle, said isosceles triangle being defined by taking as the height thereof the distance between said arrays of pins and as the base thereof the distance at which said belt travels with one reciprocation of said yarns, and by subsequent displacement of the axial centers of said yarns at a right angle to the warp axis at either one of the going and coming routes; and (d) overlaying and bonding a warp material on a lower or an upper surface or both surfaces of said yarn assembly prior to or after release thereof from said arrays of pins.

2. The method of claim 1 wherein said yarn assembly is sandwiched between an upper and a lower group of warp yarns, followed by release from said arrays of pins and by transport to rolls located adjacent to a front end of the travel path of said belt, and subsequently bonded at the intersected portions during passage through said rolls.

3. The method of claim 1 wherein a multiplicity of continuous yarns in a plurality of sets are laid into a yarn assembly having intersections in more than two axes by feeding to said belt at different respective positions and subsequently by reciprocation between said arrays of pins and in parallel to an orbit defined to cross said belt at an angle different from or symmetrical to the warp axis.

4. The method of claim 1 wherein said yarns comprise an organic yarn, inorganic yarn, metallic yarn, stranded roving, tape yarn or split yarn.

5. The method of claim 1 wherein said warp material comprises a paper, film, aluminum foil, foamed sheet, nonwoven fabric or arranged warp.

6. The method of claim 1 wherein said warp material is precoated with a binder selected from a hot-melt or emulsion-type binder or a combination thereof.

7. The method of claim 1 wherein said warp material is bonded to said yarn assembly by a binder.

8. The method of claim 1 wherein said binder comprises a hot-melt or emulsion-type binder or a combination thereof.

9. A method of producing a multiaxial nonwoven fabric, comprising the steps of: providing first and second arrays of pins disposed along respective first and second longitudinal axes; reciprocating in first and second directions a plurality of continuous yarns between the first and the second arrays of pins; longitudinally advancing the first and the second arrays of pins at different speeds relative to the reciprocating plurality of continuous yarns so as to bring the plurality of continuous yarns into hooking engagement with the first and the second arrays of pins; and controlling the different relative speeds to dispose different respective lengths of yarn between the first and second arrays of pins depending on the reciprocating direction so as to form a yarn assembly having a zigzag form by intersecting the continuous yarns on weft and oblique axes by reciprocation between the pin arrays and parallel to an orbit determined by one side of an isosceles triangle and by subsequent displacement of the centers of the continuous yarns at a right angle to the warp axis.

10. A method of producing a multiaxial nonwoven fabric according to claim 9; wherein the continuous yarns are reciprocated at a predetermined angle relative to the first and second longitudinal axes.

11. A method of producing a multiaxial nonwoven fabric according to claim 9; wherein the first and second arrays of pins are disposed along respective longitudinal axes of a conveyor belt.

12. A method of producing a multiaxial nonwoven fabric according to claim 9; wherein the first and second arrays of pins are disposed at a given pitch, and the reciprocating plurality of continuous yarns are separated from each other by the same given pitch.

13. A method of producing a multiaxial nonwoven fabric according to claim 9; wherein the plurality of continuous yarns are brought into hooking engagement with the first and second arrays of pins at respective turning points of reciprocation.

14. A method of producing a multiaxial nonwoven fabric according to claim 9; further comprising the step of bonding the yarn assembly to a warp material.

15. A method of producing a multiaxial nonwoven fabric according to claim 9; further comprising providing at least one other plurality of continuous yarns; reciprocating the at least one other plurality of continuous yarns in other first and second directions; and longitudinally advancing the first and second arrays of pins at different speeds relative to the at least one other plurality of continuous yarns dependent on the other first and second directions.

* * * * *